Dec. 23, 1947.  W. BIGOS ET AL  2,433,085
OIL PRESSURE VALVE STRUCTURE AND VENT
Filed Jan. 18, 1943  3 Sheets-Sheet 1

INVENTORS
Walter Bigos
Edward T. Vincent
BY
G. F. Hauke, Attorney

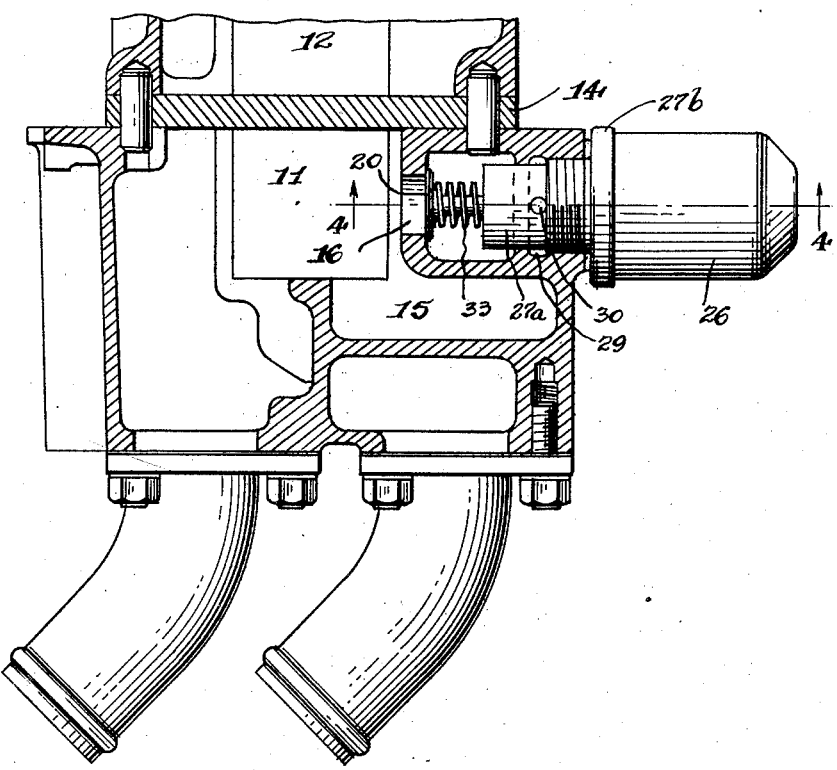
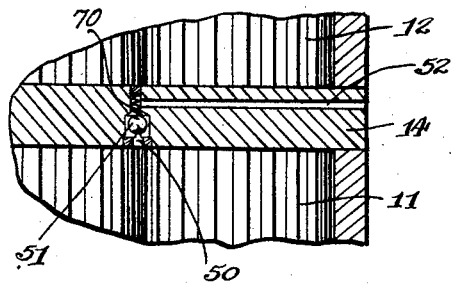
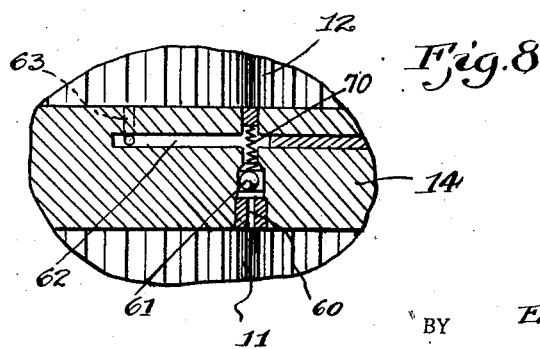

Dec. 23, 1947.  W. BIGOS ET AL  2,433,085
OIL PRESSURE VALVE STRUCTURE AND VENT
Filed Jan. 18, 1943   3 Sheets-Sheet 3
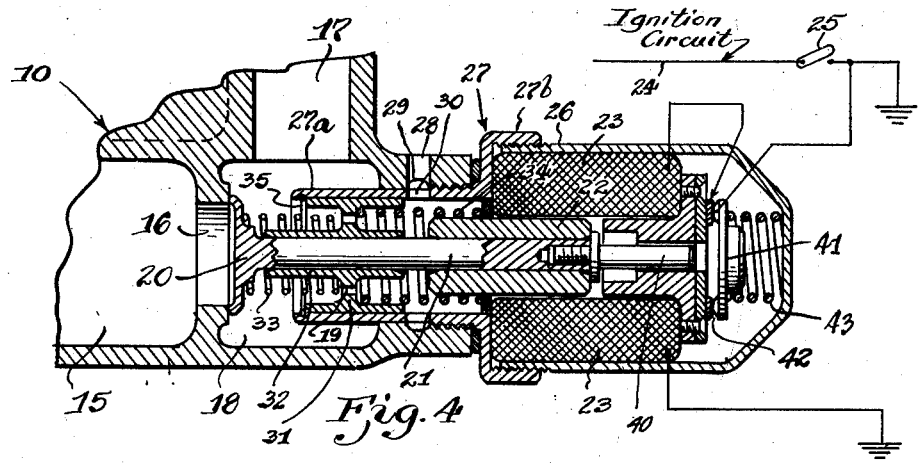
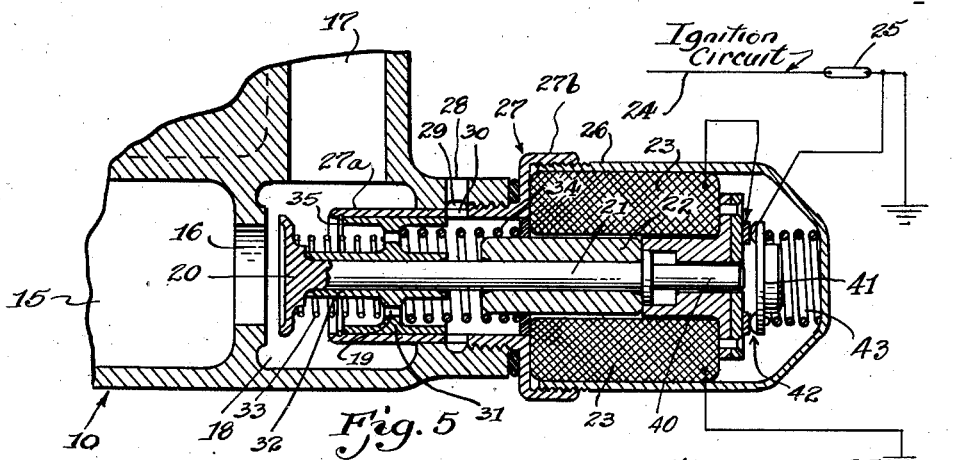
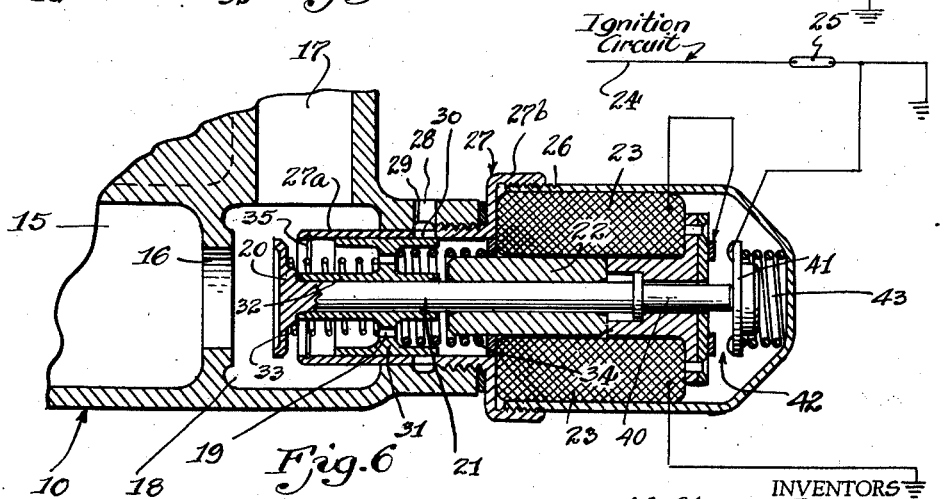
INVENTORS
Walter Bigos
Edward T. Vincent
BY G. F. Hawke.
Attorney.

Patented Dec. 23, 1947

2,433,085

UNITED STATES PATENT OFFICE 2,433,085

OIL PRESSURE VALVE STRUCTURE AND VENT

Walter Bigos, Detroit, and Edward T. Vincent, Ann Arbor, Mich., assignors to Continental Aviation & Engineering Corporation, Detroit, Mich., a corporation of Virginia Application January 18, 1943, Serial No. 472,726

9 Claims. (Cl. 123—196)

Our invention relates to internal combustion engines and more particularly to an oil pressure valve structure and vent, which is incorporated in the engine lubrication system. The present invention is more particularly applicable for use with aircraft engines.

In aircraft engines it has been the practice to install valves between the high pressure oil pump and the oil pressure lines in the engine, which valves are yieldingly held closed when the engine has been stopped and are supposed to open when the oil pressure pump begins operation. It has been observed that when using valves of this type, air is sometimes trapped in the oil pump and consequently the valve does not open when the engine is again started, since the viscosity of the air is such that the ordinary gear pump will not be able to build up sufficient pressure to open the valve between the pump and engine oil pressure line. It is also undesirable to pump this air into the oil pressure line of the engine, so therefore means for venting the lubrication system is desirable.

An object of our present invention is to improve overall engine performance by providing therefor a lubricating oil system in which is embodied a valve that yieldingly closes off the delivery outlet of the pump from the rest of the system, but which is positively opened on starting the engine to vent the oil pressure pump and insure an adequate supply of oil under pressure to the engine oil pressure line.

A further object of our invention is to construct an improved lubrication system by providing automatically operated means, which vent the system and which automatically close off the vent during engine operation.

Figure 1:
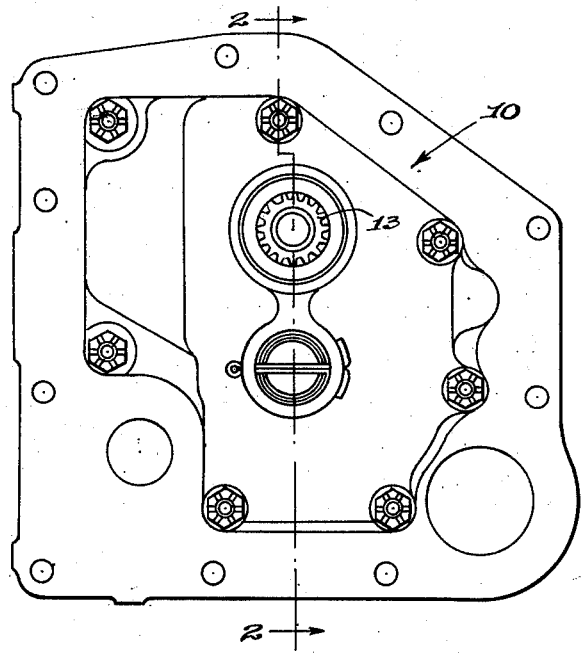
Figure 2:
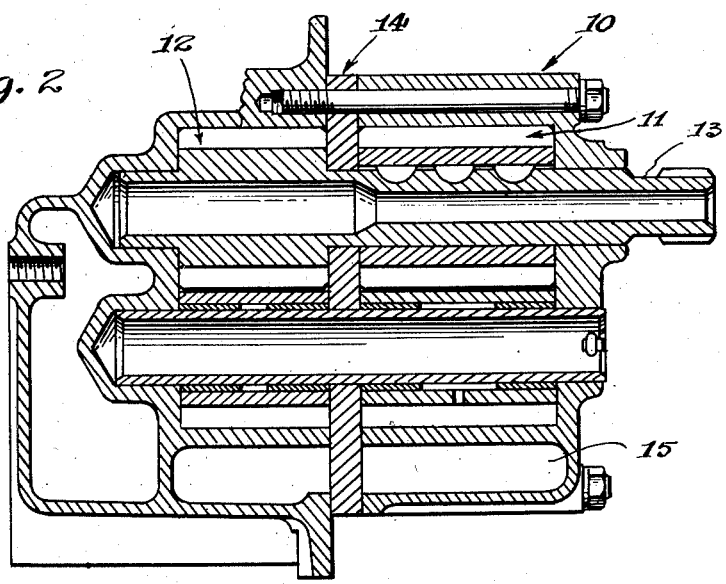

For a more detailed understanding of our invention reference may be had to the accompanying drawings illustrating preferred embodiments of our invention in which like characters refer to like parts throughout the several views, and in which, Fig. 1 is an elevational view of an oil pump structure, Fig. 2 is a sectional view thereof taken substantially on the line 2—2 of Fig. 1, Fig. 3 is a sectional detail view of a pump structure showing the valve structure which closes the pump delivery with respect to the remaining portion of the engine lubricating system, Figs. 4, 5 and 6 are detail sectional views of the aforesaid valve structure respectively showing said valve closed, partly open and fully open, Fig. 7 is a fragmentary detail sectional view of a modified vent means associated with said oil pump structure, and Fig. 8 is a fragmentary detail sectional view of a further modified construction.

The present valve structure is preferably assembled directly on the engine lubricating oil pump structure, and Figs. 1 and 2 illustrate a conventional pump construction comprising a housing or casing 10 in which is supported an oil pressure gear pump 11 and an oil scavenging gear pump 12, said pumps being driven from any suitable source of power by the pump drive shaft 13. Preferably, the pump housing and casing includes a plate 14 which separates the pressure and scavenging pumps.

Referring now more particularly to Figs. 3 to 6 inclusive, it will be observed that the oil pressure pump 11 delivers oil under pressure to the delivery chamber or passage 15, through the delivery port 16 and thence through passage 17 to the engine, where same is conducted to various engine parts which are to be lubricated. In Fig. 4, the engine is at rest and the valve structure has closed the discharge port 16. In Fig. 5, the discharge port is open as the valve has moved a little ways off its seat, while in Fig. 6, the port 16 is fully opened.

The valve structure comprises a valve head 20 and a valve stem 21, said valve stem having secured thereon a soft metal iron sleeve or core 22 which serves as a solenoid armature. The solenoid 23 is electrically connected with the engine ignition circuit 24, and when the ignition switch 25 is closed the solenoid is energized, thus moving the armature 22 axially inwardly and unseating the valve head 20 to partially open the discharge port 16. The solenoid is housed within a casing 26 and a coupling or other suitable valve support 27 is secured to the pump casing. This support comprises a tubular extension 27a, and an enlarged flange 27b to which the solenoid casing 26 is secured. The pump casing is provided with a vent opening 28 that communicates with an annular groove 29, and the tubular extension 27a is provided with ports 30 registering with the annular groove 29.

The internal bore of this tubular extension supports an axially moving vent valve 31 that in turn is provided with a hub 32 slidably fitted on the valve stem 21. It is noted that as the solenoid is energized the valve is moved against the force of the spring 33 which yieldingly seats the valve. Said valve is moved axially relative to the vent valve until same engages therewith as shown in Fig. 5. The force exerted by the solenoid is sufficient to compress spring 33, but insufficient to compress spring 34, which yieldingly holds the vent valve open as shown in Fig. 4 against the stop 35.

Thus any pocket of air in the pressure pump or in passage 15 is forced through the port 16 and vented through the vent port 28 by way of chamber 18, and the ports or holes 19 in the web 31 of the vent valve. After the oil pressure pump evacuates any air pockets, it begins to build up oil pressure, and this pressure exerted against the valve head 20 is sufficient to compress the spring 34 and permit the vent valve to be moved axially, in order to close off the vent port 30, and the parts thus assume the position as shown in Fig. 6, in which the pump discharge port 16 is fully opened and the vent port 30 is fully closed.

In the position shown in Fig. 6, the electrical circuit to the solenoid is opened. The valve stem 21 threadedly receives a pin 40, which is moved to engage the switch contact disc 41 and subsequently separate the contacts 42 against the pressure of the spring 43 which yieldingly urges the contacts 42 together. During the operation of the engine no electrical current is fed to the solenoid, and thus, the solenoid is de-energized during operation of the engine.

If, for any reason, the oil pressure drops, due to air pockets in the pump or in the passage 15, and the oil pressure is insufficient to hold the spring 34 under compression, the valves are moved again to the position shown in Fig. 5. As long as switch 25 is closed, the solenoid is energized when contacts 42 are closed, and thus the port 16 is maintained partially open, thereby allowing the pump to be vented, so that the same may again function to supply oil under pressure to the engine lubrication system. However, if the switch 25 is opened, the valves will return to the position shown in Figs. 3 and 4, thereby preventing oil in the engine storage tank, if it is located above the pump level, from draining through the pump into the engine when same is at rest.

In Figs. 7 and 8 the discharge or delivery side of the oil pressure pump is vented at all times when the engine is at rest, or when the oil pressure is insufficient to overcome the resistance of the springs 70 which hold the ball check valves 51 and 61 respectively off their seats. In Fig. 7 the passage 50 in plate 14 is open to the delivery side of the pump so same is vented. As the oil pressure increases, the ball 51 is seated closing off the vent passage 52. In Fig. 8 the ball 61 is off its seat and the delivery side of the pressure pump is vented through passage 60 to passages 62 and 63 to the suction side of the oil scavenging pump 12. The ball 61 is seated when the oil pressure is built up in a similar manner as ball 51.

It is noted that all forms of the invention provide venting means for the oil pressure pump and that the vent is closed in response to a predetermined increase in oil pressure at the delivery side of the oil pressure pump. The preferred form of our invention illustrated in Figs. 3 to 6 inclusive is provided with a valve 20 in addition to the vent valve 31, that is normally closed when the engine is at rest in order to prevent leakage of oil past the pump into the engine lubrication system. Any oil which may be carried through the vent port is discharged into the accessory case in which the aforesaid oil pump structure is carried, and the oil thus discharged is accumulated together with other engine oil in a sump or reservoir to which the scavenging pump inlet is connected.

It will be apparent that modifications and changes may be made herein without departing from the spirit of our invention or from the scope of the appended claims.

We claim:

1. In an engine lubrication system, an oil pressure pump, an oil pressure check valve structure including a valve on the delivery side of said pump constructed and arranged to open under pressure, means yieldingly seating said valve, vent means, valve means associated with said vent means, an engine ignition system including a switch, and means operable in conjunction with said engine ignition system for opening said valve and connecting the delivery side of the oil pressure pump with said vent means on closing said switch, said valve means associated with said vent means operable in response to oil pressure during engine operation to close said vent means.

2. In an engine lubrication system, an oil pressure pump, an oil pressure check valve structure including a valve on the delivery side of said pump constructed and arranged to open under pressure, means yieldingly seating said valve, vent means, valve means associated with said vent means, an engine ignition system including a switch, and solenoid means energized on closing the switch of said engine ignition system for opening said valve and connecting the delivery side of the oil pressure pump with said vent means, the said valve means associated with said vent means operable in response to oil pressure during engine operation to close said vent means.

3. In an engine lubrication system, an oil pressure pump, an oil pressure check valve structure including a valve on the delivery side of said oil pressure pump constructed and arranged to open under pressure, means yieldingly seating said valve, said valve including a valve stem, vent means, a solenoid operatively connected with said valve stem and electrically connected in circuit with the engine ignition circuit and energized on closing the engine ignition circuit to open said valve and connect the pump delivery with said vent means, a valve operable under oil pressure produced by engine operation to close said vent means, and means operable in response to oil pressure to break the electrical circuit to said solenoid.

4. In an engine lubrication system, an oil pressure pump, an oil pressure check valve structure including a valve on the delivery side of said oil pressure pump constructed and arranged to open under pressure, means yieldingly seating said valve, said valve including a valve stem, vent means, an engine ignition system including a switch, a solenoid operatively connected with said valve stem and electrically connected in circuit with the engine ignition system and energized on closing said switch of said engine ignition system to open said valve and connect the pump delivery with said vent means, a valve operable under oil pressure produced by engine operation to close said vent means, and means operable in response to oil pressure to break the electrical circuit to said solenoid, said first mentioned valve remaining open during engine operation and said yielding means operable to close said valve when said oil pressure drops on stopping the engine.

5. In an engine lubrication system, an oil pressure pump, an oil pressure check valve structure including a valve on the delivery side of said oil pressure pump constructed and arranged to open under pressure, means yieldingly seating said valve, said valve including a valve stem, vent means, an engine ignition system including an electrical circuit and a switch, a solenoid operatively connected with said valve stem and electrically connected in circuit with the engine ignition system and energized on closing the switch of said engine ignition system to open said valve and connect the pump delivery with said vent means, and means operable in response to oil pressure to close said vent and break the electrical circuit to said solenoid, said valve remaining open during engine operation and at all times when said engine ignition circuit is closed, said valve closing only when said engine ignition circuit is broken.

6. In an engine lubrication system, an oil pressure pump, an oil pressure check valve structure including a valve on the delivery side of said oil pressure pump constructed and arranged to open under pressure, means yieldingly seating said valve, said valve including a valve stem, vent means, valve means cooperatively associated with said vent means, an engine ignition system including an electrical circuit and an ignition switch, a solenoid operatively connected with said valve stem and electrically connected in circuit with the engine ignition system and energized on closing the switch of said engine ignition circuit to open said valve and connect the pump delivery with said vent means, said first mentioned valve operable on further opening thereof under oil pressure to engage said vent valve means and close same, and switch means operable on said further opening of said valve in response to oil pressure to actuate said switch means and break the electrical circuit to said solenoid.

7. In an engine lubrication system, an oil pressure pump, an oil pressure check valve structure including a valve on the delivery side of said pump constructed and arranged to open under pressure, means yieldingly seating said valve, vent means, an engine ignition system including a switch, and means operable in conjunction with the engine ignition system for opening said valve and connecting the delivery side of the oil pressure pump with said vent means substantially only on closing said switch to start the engine operation, and valve means associated with said vent means and operable in response to oil pressure at the delivery side of said pump to close said vent during normal operation of said engine.

8. In an engine lubrication system, an oil pressure pump, an oil pressure check valve structure including a valve on the delivery side of said pump constructed and arranged to open under pressure, means yieldingly seating said valve, vent means, and engine ignition system including a switch, and means operable in conjunction with said engine ignition system for opening said valve and connecting the delivery side of the oil pressure pump with said vent means on closing said switch, and means operable in response to an increase in oil pressure as induced by normal engine operation to close said vent means.

9. In an engine lubrication system, an oil pressure pump, an oil pressure check valve structure including a valve on the delivery side of said pump constructed and arranged to open under pressure, means yieldingly seating said valve, vent means, an engine ignition system including a switch, and solenoid means energized on closing said switch of said engine ignition system for opening said valve and connecting the delivery side of the oil pressure pump with said vent means, and means operable in response to an increase in oil pressure induced by normal operation of said engine to close said vent means.

WALTER BIGOS.
EDWARD T. VINCENT.

REFERENCES CITED

The following references are of record in the file of this patent:

UNITED STATES PATENTS

| Number | Name | Date |
| --- | --- | --- |
| 693,479 | Worthington | Feb. 18, 1902 |
| 966,423 | Blauvelt | Aug. 9, 1910 |
| 1,481,199 | Haentjens | Jan. 15, 1924 |
| 1,873,396 | Hallenbeck | Aug. 23, 1932 |
| 2,225,175 | Koerner | Dec. 17, 1940 |

FOREIGN PATENTS

| Number | Country | Date |
| --- | --- | --- |
| 128,170 | Austria | May 10, 1932 |
| 130,997 | Austria | Dec. 27, 1932 |
| 304,905 | Great Britain | Jan. 31, 1929 |
| 364,782 | Italy | Nov. 14, 1938 |
| 611,339 | France | July 3, 1926 |
| 811,225 | France | Jan. 14, 1937 |